United States Patent [19]
Just

[11] Patent Number: 5,440,354
[45] Date of Patent: Aug. 8, 1995

[54] COLOR COORDINATED EYEGLASSES

[76] Inventor: Henrietta K. Just, 34 Ridge Rd., Hartsdale, N.Y. 10530

[21] Appl. No.: 209,640

[22] Filed: Mar. 10, 1994

[51] Int. Cl.$^6$ .............................................. G02C 11/02
[52] U.S. Cl. .................................... 351/52; 351/158
[58] Field of Search ................... 351/41, 51, 52, 158

[56] References Cited

U.S. PATENT DOCUMENTS

| | | | |
|---|---|---|---|
| 4,282,355 | 5/1989 | Lipson et al. | 351/51 |
| 4,687,306 | 8/1987 | Lipson et al. | 351/52 X |
| 4,848,889 | 7/1989 | Shaw | 351/51 |
| 5,184,482 | 2/1993 | Cloud | 63/14.1 |

FOREIGN PATENT DOCUMENTS

| | | | |
|---|---|---|---|
| 466034 | 5/1937 | United Kingdom | 351/51 |
| WO84/03111-54 | 8/1984 | WIPO | 351/51 |

*Primary Examiner*—William L. Sikes
*Assistant Examiner*—David R. Parsons
*Attorney, Agent, or Firm*—Lucas & Just

[57] ABSTRACT

A pair of eyeglasses is disclosed in which at least a portion of the frame is made with a bore along its length. The bore can be filled with a colored material in order to change the appearance of the eyeglasses. Colored pipe cleaners are suitable for use as the colored material.

16 Claims, 1 Drawing Sheet

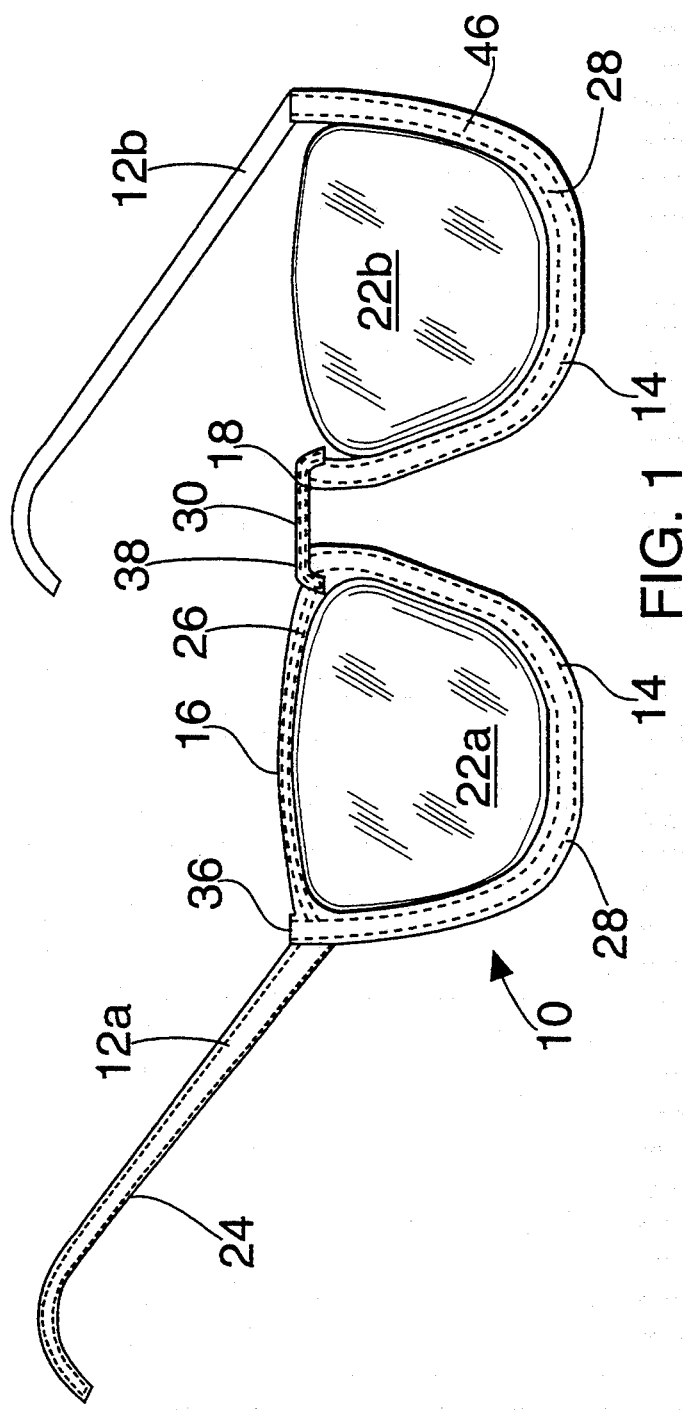
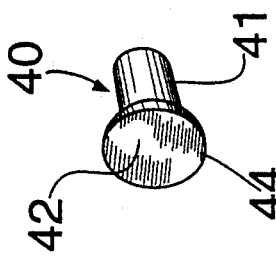
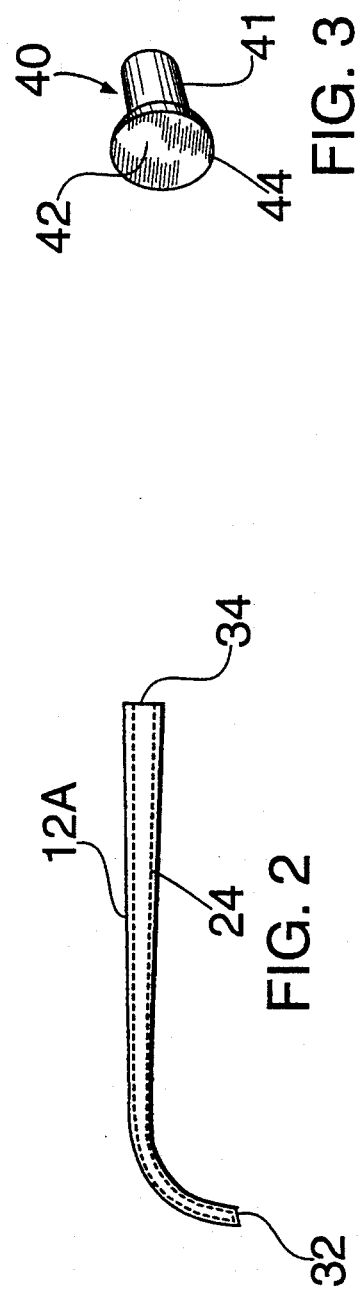

COLOR COORDINATED EYEGLASSES

The present invention relates to eyeglasses and, in particular, to eyeglasses which can be coordinated with the outfit of the wearer.

Eyeglasses come in many different shapes and colors. With respect to colors, an eyeglass frame which looks acceptable with one outfit of the wearer might look totally out of place with another outfit. As a result, eyeglass wearers frequently select an eyeglass frame which is neutral, i.e. clear plastic, a muted shade of gray or brown, or a metal rim. While such eyeglasses may certainly function well, it is not easy to coordinate the eyeglasses to the wearer's outfit unless one has a number of different pairs of eyeglasses in different colors and hues.

It would be desirable to have a single set of eyeglass frames which could be readily adapted to different colors and/or different color schemes. There have been previous attempts to accomplish this. For example, about 10-15 years ago, a set of eyeglasses was offered with different colored members which snapped over the top of the upper rim and the bridge, thus allowing the use of different colors along the upper edge of the eyeglasses. More recently, the Swiss company Swatch has introduced eyeglass frames with interchangeable faces which snap onto and off of the lens rims. With both of these prior art devices, the principal disadvantage is that the change in color is with a piece that snaps on or off. That which applies by snapping on can inadvertently snap off and get lost. Similarly, a snap attachment means is inherently weak and subject to flex stress and breakage.

The applicant has now overcome the disadvantage of prior art devices and has discovered an eyeglass frame in which the color can be readily changed, and yet there is no need for snapping on a device in order to change the color. In accordance with the present invention, at least a portion of the eyeglass frame is made hollow. As used herein, the term eyeglass frame includes the lens rims or bows, the upper lens rims, the bridge, and the temples. Any one or more of these may be made hollow. A suitable coloring member can then be inserted into the hollow frame member in order to change the color of the eyeglass frames. It is important that the hollow frame member be accessible during the lifetime of the eyeglasses so that the colored member inserted into the hollow member can be interchanged for a different colored member from time to time, as desired. Having a hollow frame member which is filled with a colored member once and then permanently sealed is not within the contemplation of the present invention.

These and other aspects of the present invention may be more fully understood with reference to the drawings wherein:

FIG. 1 shows a pair of eyeglasses in accordance with the present invention;

FIG. 2 shows a temple according to one aspect of the present invention; and

FIG. 3 shows an end cap which can be utilized in accordance with one aspect of the present invention.

As shown in FIG. 1, the eyeglasses 10 comprise temples 12a and 12b, lens rims or bows 14, upper rims 16, bridge 18 and lenses 22a and 22b. As illustrated, temple 12a has a lengthwise bore 24, while temple 12b is solid. Similarly, upper rim 16 above lens 22a has a lengthwise bore while lens 22b is shown without an upper rim. Lens bows 14 are also provided with lengthwise bores 28, and bridge 18 is provided with lengthwise bore 30.

The frames of the eyeglasses are suitably made of transparent plastic, and are preferably clear, at least for those portions of the frames which have bores for receiving colored material. Suitable materials from which to make the frames include polycarbonate, polyacrylate and polymethacrylate.

The diameter of the bores will largely depend on the size of the frames. The bores will typically have a diameter of 1/16–3/16 inch, and are preferably about ⅛ inch. It is possible, of course, for different elements to have different diameter bores, e.g. for the diameters of the bores of the temples to be larger (or smaller) than the diameters of the bores of the lens rims. While it is preferred that the bores be circular in cross-section because of ease of manufacture, the bores can have any cross-sectional shape desired, including square, elliptical, rectangular, irregular, and the like.

Any of bores 24, 26, 28 and 30 can be filled with a colored material. Furthermore, temple 12b could, like temple 12a, have a bore 24 and there could be an upper rim 16 above the lens 22b and it could have a bore 26.

The colored material to be inserted into the bores 24, 26, 28 and 30 of the eyeglass frames 10 is not overly important except that it should be easy to insert. Suitable materials for insertion are plastic tubes, either solid or hollow, plastic coated wire, stiff rope or string and pipe cleaners. Of the foregoing, pipe cleaners are preferred. Pipe cleaners are quite easy to insert; in addition, they are readily available in a multiplicity of colors. More importantly, one can obtain white pipe cleaners and then dye them, much like Easter eggs, to obtain an exact match for the outfit which the person is planning to wear. While it might take a little bit of trial and error to get the exact color, or contrast, which one wants, pipe cleaners are quite inexpensive and trying different colors is not an expensive proposition. Pipe cleaners are also desirable because they are designed to be absorbent and will readily absorb most dyes or coloring material in which they are immersed.

Where the colored material to be inserted in the bores is solid as just discussed, the ends of the various bores can be left open. Referring to FIG. 2, there is shown temple 12a with bore 24. The ends 32 and 34 of the bore 24 are open. A solid colored member can be inserted into open end 32 of bore 24. When it is desired to change the solid colored member, another solid colored member can simply be forced into open end 32. This will push the existing solid colored member out through end 34, thus making for ready replacement of the solid colored member. End 34 of temple 12a could also be a blind hole, in which case one would remove the solid colored member from end 32, e.g. with tweezers or needle-nosed pliers.

Bores 28 of lens bows 14 can similarly be filled by inserting a colored material through open end 36. When the colored material is to be replaced, the new colored material is introduced through end 36 and this forces the existing colored material to exit through open end 38.

It will be appreciated that not all of the bores need be filled with colored material. Similarly, different bores can have different colored material. For example, the bridge bore colored material can be a different color from that used for the lens rims. For a special effect, the colored material used in one of the lens rims can be different from the color of the colored material used in the other lens rim. For even further special effect, more than one color can be utilized in a single bore, e.g. by using short lengths of different colored pipe cleaners and inserting them seriatim. The special effects can obviously also be used for the temples. It will also be appreciated that there could be but a single element that has a bore to receive a colored material, e.g. one of the lens bows has a bore and the other lens bow is solid.

If desired, end caps, such as illustrated in FIG. 3, can be provided to seal off any of the bores. The end caps 40 suitably are made of flexible material and comprise a cylindrical body portion 41 and a circular flange 44. The end cap is press fit into the ends of the bore desired to be sealed, e.g. ends 32 and 34 of bore 24.

While it is preferred that the colored material be a solid, such as flexible tubing or a pipe cleaner, it is also within the contemplation of the present invention for the colored material to be a liquid. Referring again to FIG. 2, the preferred way to employ a liquid coloring material is to provide each end 32 and 34 of the temple 12 with an end cap 40 (FIG. 3). The end cap has a small aperture 42 in the flanged portion 44 which covers the end. The size of the aperture 42 is large enough to permit a liquid to be introduced into the the bore 24 under pressure but small enough so that, once introduced, the liquid will not flow out of the aperture 42 unless it is again subjected to pressure. Where a liquid coloring material is desired, a suitable dye can be dissolved or suspended in a carrier. It is preferred that the carrier be highly polar, such as water, since this will have the least likelihood of leaking out of hole 42. If desired, of course, a plug can be provided to seal off aperture 42.

The lenses 22a and 22b may be of any desired shape and/or color. They can be clear or colored; they can be non-correcting, magnifying or prescription. If desired, the lenses 22a and 22b can be made replaceable by snapping in and snapping out so that one can go from reading glasses to sunglasses and still use the same frame. Indeed, the device of the present invention may be used as novelty glasses without any lenses.

In the best mode contemplated by the inventor at the present time, the temples 12a and 12b are solid and do not have a bore. The lens bows 14 have bores 28 which are open at ends 36 and 38. The bores 28 have a nominal diameter of ⅛ inch. Pipe cleaners of various colors are used as the coloring members and are inserted into the lens bows through either end 36 or 38. A pipe cleaner 46 is shown in the bore 28 of lens bow 14 associated with lens 22b. The pipe cleaner is replaced by simply pushing another one into the bore 28 through end 36 which simultaneously forces the existing pipe cleaner from the bore through end 38.

It will be understood that the claims are intended to cover all changes and modifications of the preferred embodiments of the invention herein chosen for the purpose of illustration which do not constitute a departure from the spirit and scope of the invention.

What is claimed is:

1. An eyeglass frame comprising two lens bows and two temples, at least each of said lens bows or each of said temples having a lengthwise bore therein, and a removable pipe cleaner in at least one said bore.

2. The eyeglass frame of claim 1 wherein each said lens bow has a said bore and wherein each said bore of said lens bow has a removable pipe cleaner therein.

3. The eyeglass frame of claim 2 wherein the ends of each said bore are open.

4. The eyeglass frame of claim 3 wherein each open end of the bore is fitted with a cap.

5. The eyeglass frame of claim 1 wherein each said temple is solid and does not have a lengthwise bore therein.

6. The eyeglass frame of claim 1 wherein the pipe cleaner is colored.

7. The eyeglass frame of claim 1 further comprising a bridge, said bridge having a lengthwise bore therein.

8. The eyeglass frame of claim 7 wherein the bore of said bridge has a replaceable colored material therein.

9. An eyeglass frame comprising two lens bows and two temples, each said lens bow having a lengthwise bore therein, and a removable pipe cleaner in each said lens bow.

10. The eyeglass frame of claim 9 wherein the ends of each said bore are open.

11. The eyeglass frame of claim 10 wherein each open end of the bore is fitted with a cap.

12. The eyeglass frame of claim 9 wherein the pipe cleaner is colored.

13. An eyeglass frame comprising two lens bows and two temples, each said lens bow and each said temple having a lengthwise bore therein, and a replaceable pipe cleaner in each said lens bow and each said temple.

14. The eyeglass frame of claim 13 wherein the ends of each said bore are open.

15. The eyeglass frame of claim 14 wherein each open end of the bore is fitted with a cap.

16. The eyeglass frame of claim 13 wherein the pipe cleaner is colored.

* * * * *